Figure 1:
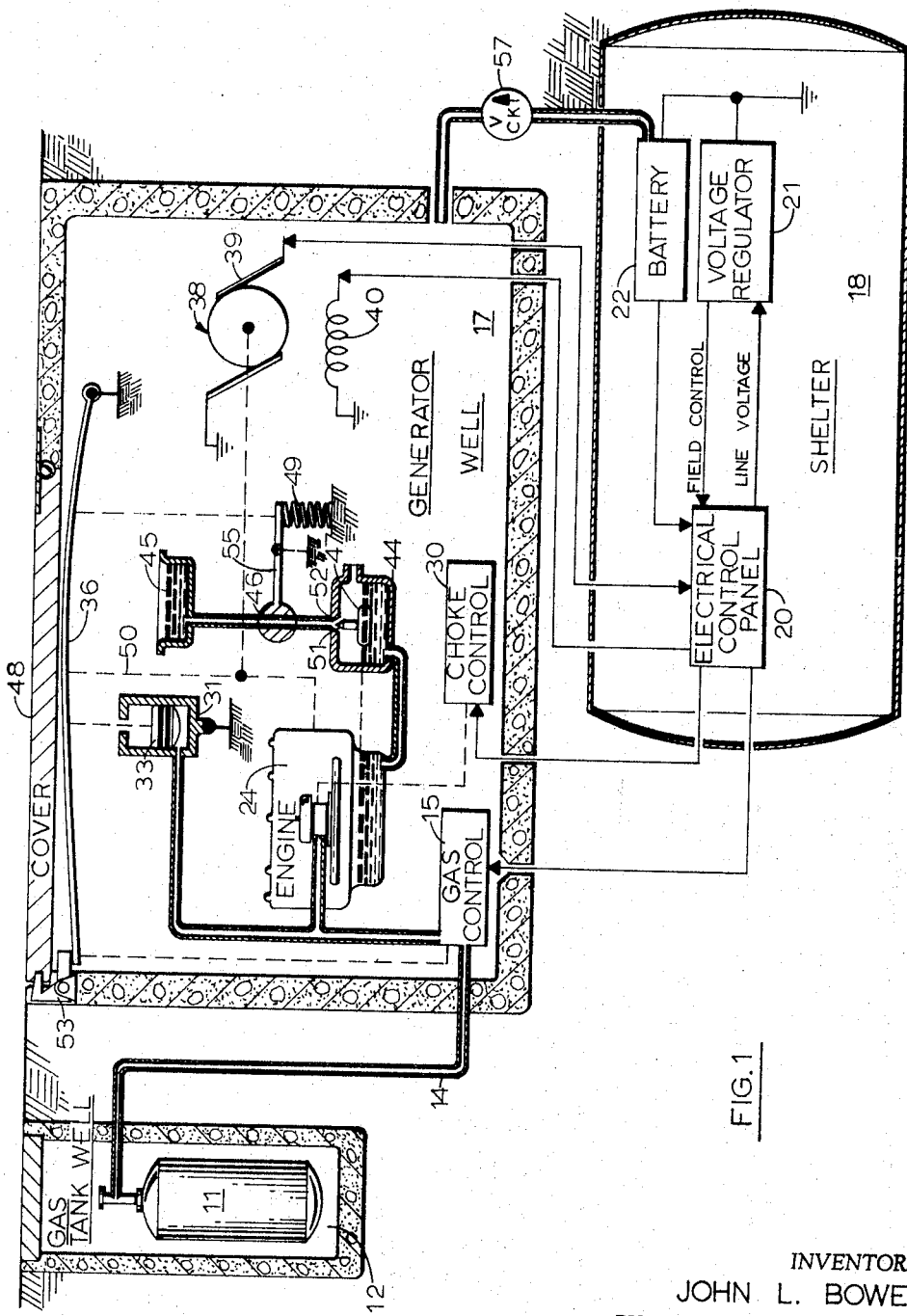

April 25, 1967  J. L. BOWER  3,316,414
ELECTRICAL POWER SYSTEM FOR A CIVIL DEFENSE SHELTER
Filed Aug. 5, 1963  3 Sheets-Sheet 1

INVENTOR.
JOHN L. BOWER
BY
Edward A. Soholski
ATTORNEY

INVENTOR.
JOHN L. BOWER
BY
Edward A. Sokolski
ATTORNEY

INVENTOR.
JOHN L. BOWER
BY
ATTORNEY

United States Patent Office 3,316,414
Patented Apr. 25, 1967

3,316,414
ELECTRICAL POWER SYSTEM FOR A CIVIL DEFENSE SHELTER
John L. Bower, 501 24th St., Santa Monica, Calif. 90402
Filed Aug. 5, 1963, Ser. No. 299,726
7 Claims. (Cl. 290—1)

This invention relates to an electrical power system for a civil defense shelter and more particularly to such a system which is capable of efficiently supplying power for long periods of time.

A good electrical power system is an essential part of a civil defense shelter especially if it is expected that such shelter is to be used as a habitation for a moderately long period of time as would be anticipated in the event of an atomic attack. Such an electrical power system, to be effective, must be capable of self-sustaining operation for long periods and must be entirely controllable from within the shelter.

Prior art electrical systems have several shortcomings in the type of civil defense applications to be anticipated under an atomic attack. Firstly, some of these systems are inefficient in their utilization of fuel and electrical power. Due to the fact that no external sources of energy can be relied on in the case of atomic attack, the resources at hand must be utilized to maximum efficiency in a civil defense system. Further, such systems have inadequate flexibility to deal with a variety of conditions under which a shelter power system may have to be utilized. Often too, where part of the system is outside the shelter, there is a lack of adequate provision for protecting this portion of the system against blast, heat and other effects which could be anticipated during an atomic attack. Such systems also fail to have their fuel supplies arranged for long term storage without deterioration and without accumulation of harmful deposits in critical working parts. Further, some of the prior art electrical systems maintain the fuel supply and generator engine drive in the shelter compartment, thereby exposing personnel to explosion and fire hazard as well as to the noise generated by the system. Such systems also fail to take into account the necessity for providing complete control of the engine generator from within the shelter and with the engine-generator mounted exteriorly thereto provide inadequate means for starting up and shutting down the generator at will from a remote position.

The device of this invention overcomes the shortcomings of the prior art in providing a simple and reliable electrical power system which is capable of long term operation. The engine generator utilized is mounted in a separate compartment and protected therein from blast and heat. The fuel supply for the engine is similarly located exterior to the shelter. Means are provided within the shelter to completely control the start-up and shut-down of the engine-generator. Control means are also provided for venting of the engine during its operative periods and completely sealing off such venting during the non-operative times. Such control is accomplished at high efficiency and with the low consumption of energy. The engine and its associated fuel supply being completely isolated from the shelter, none of the hazards or noise incidental thereto are encountered by the occupants of the shelter. The control system for starting up and shutting down the generator is extremely simple to operate and requires but a minimum amount of instruction for optimum use of the system. Unique means is provided for developing a high power mechanical actuation with the starting of the engine. This actuation is used both to open the generator compartment cover for venting and to assist in the engine starting operation. The output of the engine driven generator is precisely regulated by a voltage regulator, and this output may be utilized as the power output, to charge a battery utilized with the system or for both purposes simultaneously. The system is such that the outputs of both the generator and the battery may be utilized to simultaneously supply a high load if this be necessary so that the sum of the power handling capacities of both the battery and the generator can be called upon. Especially for later phases of shelter occupancy, the power supply can be operated conveniently from substitute fuel such as gasoline.

It is therefore an object of this invention to provide an improved emergency electrical power system.

It is a further object of this invention to provide an emergency electrical power system in which a remotely controlled engine generator is utilized and such engine generator is controlled from a shelter.

It is another object of this invention to provide an emergency power system for utilization with a fall-out or blast shelter capable of highly efficient operation over long periods of time.

It is still another object of this invention to provide an emergency power system utilizing an engine generator the electrical output of which is precisely regulated.

Figure 2:
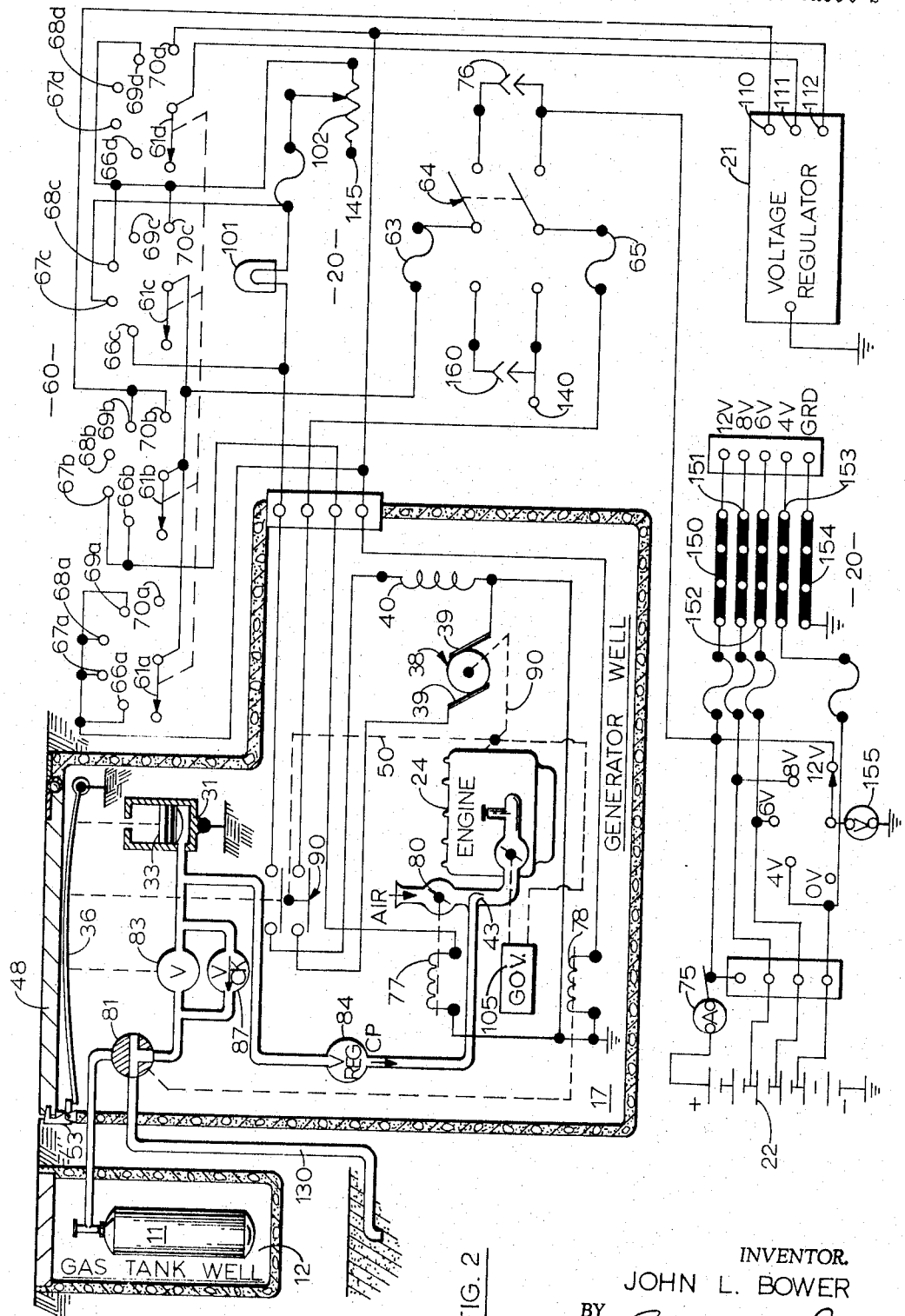
Figure 3:
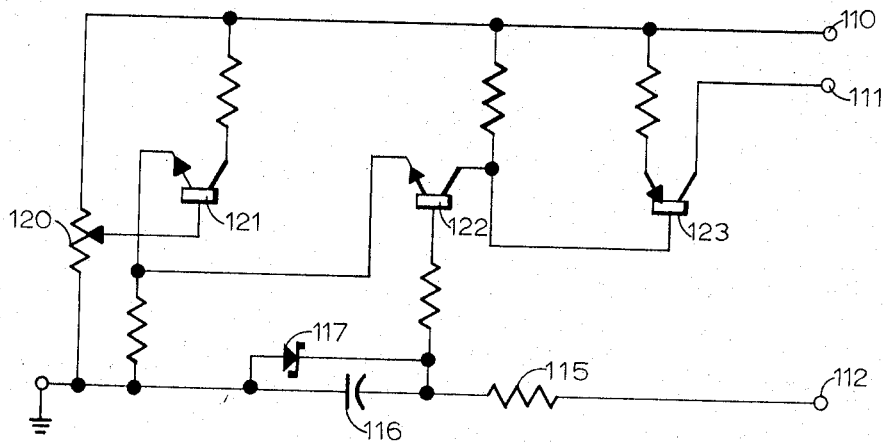

Other objects of this invention will become apparent from the following description taken in connection with the accompanying drawings of which:

FIG. 1 is a schematic drawing illustrating the basic operation of the device of the invention, FIG. 2 is a schematic drawing showing a preferred embodiment of the device of the invention, and FIG. 3 is a schematic drawing showing a voltage regulator which may be utilized in the device of the invention.

Referring now to FIG. 1, the basic operation of the device of the invention is illustrated. Gas tank 11 is housed in gas tank well 12. This gas tank is pressurized and may, for example, contain propane or butane at about 100 p.s.i. Gas is fed from gas tank 11 in line 14 to gas control 15 which is located in generator well 17. Located in shelter 18 are electrical control panel 20, voltage regulator 21, and battery 22. In starting up engine 24, which is located in generator well 17, an appropriate switch is thrown on electrical control panel 20 to actuate gas control 15 and choke control 30.

As to be explained in detail in connection with FIG. 2, when gas control 15 has been actuated, the gas in line 14 is passed through the gas control 15 to engine 24, and also to cylinder 31. Cylinder 31 has a piston 33 therein which is driven upward by the gas pressure. Piston 33 is mechanically connected to hinged rod 36 and causes this rod to move upward thereby releasing cover latch 53 and raising cover 48 until the upward motion of rod 36 causes gas control 15 to cut off the gas supply to cylinder 31 when the correct opening has been achieved. In this fashion, venting is provided for the engine. Cover 48 is heavy enough to provide normal protection to the engine against blast and heat yet is readily raised the desired amount by piston 33.

With gas control 15 actuated, gas is allowed to pass to the engine. Choke control 30 being actuated, the engine choke is held partly closed during engine starting to provide good suction for drawing gas into the engine. The details of the operation of gas control 15 and choke control 30 will be explained in connection with FIG. 2 further on in the specification.

Generator 38 is utilized as a starting motor by feeding power from battery 22 through electrical control panel 20 to the armature 39 and the field 40 of the generator. The generator thus acts as a D.C. motor and turns the engine over through the belt (not shown). Engine starter pull rope 50 is mechanically connected to rod 36 and helps to start to turn over the engine as the cover rises, thereby helping overcome the compression starting torque of the engine. This facilitates starting with a battery in poorer condition of starting charge.

The individual cells of battery 22 are vented to the generator well through check valve 57. The individual cells of the battery are vented to make sure that the gasses generated in charging the battery are released outside the shelter without allowing contaminants to enter.

Means are provided to fill the oil tank 44 of the engine automatically when the engine is not running. Oil reservoir 45 is connected to oil tank 44 through valve 46. When cover 48 is down and rod 36 is in its down position, valve 46, as shown in FIG. 1, permits oil to flow from reservoir 45 into tank 44 until the tank is filled at which time float valve 47 will prevent further flow of oil. The tip portion 51 of the float valve is permanently magnetized and when it comes close to mating top portion 52 of tank 44 which is fabricated of magnetic material, tip portion 51 magnetically joins to top portion 52 to seal off the tank. When rod 36 is in the extended position, spring 49 which is mechanically connected to the rod is permitted to extend, thereby closing valve 46 through arm 55 and preventing any flow of oil between reservoir 45 and tank 44. By use of a second nozzle (not shown) in the carburetor venturi similar to nozzle 43 (FIG. 2), liquid fuels such as gasoline may be fed into the carburetor from a conventional float-valve level control. If the tank 11 is then pressurized with air or carbon dioxide, the system may be operated on the liquid fuel. If tank 11 is pressurized with fuel gas as shown, a mixture of fuels may be used.

Referring now to FIG. 2, a preferred embodiment of the device of the invention is illustrated. Operation of the generator is controlled entirely from inside the shelter, and all of the components shown in FIG. 2 other than those shown within generator well 17 and gas tank well 12 excepting, of course, the inter-connecting lines and outlets, are located within the shelter 18.

Stacked switch 60 which is mounted on electrical control panel 20, has a plurality of ganged contact arms 61a–61d. The switch as shown in FIG. 2 is in the "off" position. Contact arms 61a–61c are connected through fuse 63 to knife switch 64. Contact arm 61d is connected to terminal 111 of voltage regulator 21.

In starting the generator, contact arms 61a–61d are simultaneously moved from the off position into contact with stationary contacts 66a–66d respectively. Knife switch 64 is also thrown to the right to connect the positive terminal of battery 22 through ammeter 75 and jumper 76 to contact arms 61a–61c. Battery voltage is thereby applied through switch contact 66b to choke solenoid 77 and through contact 66a to gas solenoid 78. Choke solenoid 77 when so actuated closes choke 80. Gas solenoid 78 when so actuated switches valve 81 so that it allows the gas from pressurized gas tank 11 to flow to limit valve 83.

The control for limit valve 83 is mechanically coupled to rod 36 and this valve is held open with rod 36 in the down position (as indicated in FIG. 2). Gas will therefore flow through valve 83 to pressure regulator valve 84 and into cylinder 31, driving piston 33 upward. As already noted in connection with FIG. 1, when piston 33 is driven upward, its arm drives rod 36 upward and opens cover 48 of the generator well, thereby providing ventilation for the engine.

Check valve 87 which is in parallel with limit valve 83 is closed to flow from gas tank 11. Piston 33 and cover 36 along with it rises until the approximate proper opening is reached for ventilation, at which time limit valve 83 is substantially closed by virtue of its mechanical connection to rod 36 thereby cutting off any further flow to cylinder 31. The gas in cylinder 31 flows through regulator valve 84 to the engine. This lowers the pressure in the cylinder tending to allow piston 33 to descend slightly carrying along with it rod 36. However, by virtue of the fact that when rod 36 starts to descend valve 83 starts to open, the gas pressure rises to drive the piston up again. The net result is a low amplitude oscillating condition of rod 36 about the desired point. The gas pressure at the input to regulator 84 is somewhat regulated by virtue of this operation. The piston is thus held in a nominally fixed position by the pressure of the gas in the cylinder and the cover is thereby maintained substantially in the desired opened position. The level to which cover 48 opens is therefore independent of the weight of the debris, etc. that may have blown onto the cover and is precisely determined by the control system.

Simultaneously with the opening of cover 48, limit switch 90 is closed by virtue of its mechanical connection to rod 36 and connects battery power from contact 66c to generator field 40 and such same power through switch 64 and fuse 65 to the generator armature 39.

Generator 38 is a shunt wound machine similar to an automative generator, and it therefore functions as a direct current motor with such power applied and drives engine 24 through the belt drive 90. The starting of the engine is aided, as already noted, by the action of pull rope 50 which is attached to rod 36.

With choke 80 closed by solenoid 77, there is an increase of vacuum in the engine's intake manifold and carburetor and this causes pressure regulator 84 to release fuel into the carburetor. Pressure regulator 84 is a conventional gas pressure regulator which only allows gas through when there is a predetermined vacuum condition in the engine intake. A suitable such regulator is commercially available from the Bendix Corporation. This choking technique has the advantage of releasing fuel only when the engine is drawing it in and therefore provides safer starting than other methods of starting gas-fuel engines.

When the engine starts to fire, the speed thereof rises until the power demand from battery 22, as indicated on ammeter 75, drops to zero or even reverses. When this condition is reached, the operator moves contact arms 61a–61d to contacts 67a–67d. The only change that this effects is to insert incandescent lamp 101 in series with the current supply to field winding 40, this being effected through contact 67c. This has the effect of reducing the power demand from the generator and hence from the engine, allowing the speed to rise.

When the engine speed has risen to a higher operating speed, ammeter 75 shows a stable value of current at which time the operator moves switch 60 to bring contact arms 61a–61d into contact with contacts 68a–68d. In this position, power is removed from choke solenoid 77 (68b being a floating contact), and the current in field winding 40 is reduced by the insertion of rheostat 102 in series with the current supply to this winding (the connection of arm 61c to 68c).

With the de-energization of solenoid 77 and the opening of choke 80, intake air flows freely into the carburetor to permit normal engine operation. The speed of the engine rises until full power is delivered into the battery through the armature line and the charging rate continues at maximum rate. Over-speed is prevented by speed control governor 105 which closes the throttle if the speed tends to become excessive.

When it is desired to operate the various shelter accessories such as the blower, lights, radio equipment, etc., while continuing to charge the battery, it is necessary to control the output of the generator to prevent an excessive line voltage. It is also desirable to closely regulate the output of the generator so that it can independently be utilized to supply such line voltage. This end result is achieved by moving contact arms 61a–61d into contact with contacts 69a–69d thereby connecting voltage regulator 21 into the circuit. With switch 60 in this position, the power line with the output of battery 22 and generator 38 connected thereto is connected through contact 69b to terminal 110 of voltage regulator 21, the field 40 of the generator is connected to terminal 111 of the voltage regulator through switch contact 69d, and the power line from the battery and the generator is connected through switch contact 69a to terminal 112 of the voltage regulator.

Referring now additionally to FIG. 3, the voltage regulator operates as follows. The line voltage applied to terminal 112 of the voltage regulator is fed through resistor 115 to zener diode 117. Zener diode as is well known in the art will maintain a fixed voltage across its terminals when broken down by the application of a positive potential to its cathode and a negative potential to its anode. Zener diode 117 maintains a fixed voltage across its terminals equal to about ½ the nominal line voltage.

Potentiometer 120 is utilized to set the voltage at which the regulation is desired. The fraction of the total line voltage set at the arm of the potentiometer 120 is effectively maintained equal to the voltage across the zener diode 117 by the regulator. This is achieved in the following manner. If the voltage at the arm of potentiometer 120 should start to rise above the zener diode voltage, the emitter current and potential of transistor 121 and the potential of the emitter of transistor 122 which is connected thereto will tend to rise thereby reducing the base current of transistor 122 and the collector current of this transistor. Since most of the current change of the collector of transistor 122 passes through the base of power transistor 123, the reduction of the collector current of transistor 122 causes the collector current of transistor 123 to decrease. The collector of transistor 123 is connected to terminal 111 which runs through switch arm 61d and switch contact 69d to field winding 40 of the generator. Consequently, a decrease in the transistor current causes a similar decrease in the generator field current and a corresponding drop in the output voltage of the generator. In this fashion, the line voltage and the voltage at the arm of potentiometer 120, which is a fixed fraction of the line voltage, is maintained in a constant relation to the zener diode breakdown voltage of zener diode 117. In an operative embodiment of the device of the invention, the voltage regulator maintains the line voltage constant within a few tenths of a volt even when the battery is disconnected from the circuit.

If excessive load is thrown on the generator, the field current is increased but never beyond the point at which the engine and generator can deliver maximum power, since the power transistor cannot deliver field current beyond the maximum field setting made for this purpose on rheostat 102 operating in conjunction with lamp 101. Thus, an increase in power demand can never stall the engine. Extremely large power demands such as occasioned by the starting of a large blower or the operation of a number of devices all at once can be handled by the combined load capacities of the generator and the battery, in view of the close regulation capabilities of the voltage regulator.

When it is desired to restore charge to a partially discharged battery and then shut down the generator automatically when the battery has been fully charged, selector arms 61a–61d are moved into contact with contacts 70a–70d. In this switch position, line voltage continues to be supplied to terminal 110 and hence across potentiometer 120. The output of the power transistor 123 however, which appears at terminal 111 is now connected through switch contact 70d to gas solenoid 78. Terminal 112 which is connected to zener diode 117 is also connected to gas solenoid 78. When operation in this last switching position is commenced and the voltage is low on the battery to be charged, the potential at the slide of potentiometer 120 will be low, and hence the voltage at the emitters of transistors 121 and 122 is low relative to the voltage across zener diode 117. Consequently, the current output of transistor 123 is high. This current, as already noted, is connected to flow through gas solenoid 78, fully energizing the solenoid. As the battery charges, the voltage across potentiometer 120 will increase. Initially, this will cause no change in the collector current of transistor 123 because the unbalance between the voltage at the arm of potentiometer 120 and that across zener diode 117 will cause transistor 122 to pass maximum collector current and saturate transistor 123. However, as the voltage at the arm of potentiometer 120 approaches that across zener diode 117, the collector current of transistor 122 will decrease. This will cause a corresponding decrease in the current output of transistor 123.

The zener reference voltage for zener diode 117 supplied to terminal 112 is derived from the output of transistor 123, terminals 111 and 112 being connected together with the switch in this last position. Consequently, the zener reference voltage will drop with the decrease in the output current of transistor 123. This reference voltage will finally drop to the point where the zener diode will no longer conduct and the current output of transistor 123 is cut off. Solenoid 78 is consequently deactuated, and gas valve 81 shuts off the supply of gas from gas tank 11 to the engine. Capacitor 116 prevents the voltage across zener diode 117 from rising suddenly with the voltage transient produced when the generator is shut down. Such a transient might reenergize solenoid 78.

With solenoid 78 deactuated, valve 81 (as shown in FIG. 2) connects the line running from cylinder 31 to outlet line 130 which runs into a sand pit. There is a pressure differential between the cylinder and outlet line 130 and the gas therein will be expelled through check valve 87 and gas valve 81 into outlet line 130. Piston 33 will drop down with the release of pressure, thereby bringing with it rod 36, and cover 48 will be closed and latch 53 engaged. Also with the dropping of cover 48, limit switch 90 will be opened, cutting off the armature and field circuits of the generator from the power line. In this fashion, the battery can be charged up and then automatic shut-off of generator operation achieved when such charged condition has been achieved.

If it is desired to charge an auxiliary battery or to supply an external load from the generator without disturbing the main battery and loads connected to the distribution system, such external load or battery can be connected between terminal 140 and ground. The generator is then started as already explained and switch 64 is thrown to the left to connect the system to terminal 140.

If it is desired to vary the output voltage or current of the generator while operating in the un-regulated mode, i.e. when on positions 67a–67d of switch 60, terminal 145 of rheostat 102 can be grounded and plug 160 which is normally connected to the upper portion of switch 64, disconnected from the bottom portion of this switch and connected directly to the 12 volt line to provide generator field excitation independent of the generator output. This field voltage can then be adjusted by means of rheostat 102 to provide the desired generator output at terminal 140. Voltage different from normal may thus be supplied for special requirements in the shelter.

Power outputs of 4, 6, 8, or 12 volts are achieved by connecting the output busses 150–153 to separate combinations of the cells of battery 22. The voltages of the cells can be checked by means of voltmeter 155. Each output line is appropriately fused.

The device of this invention thus provides a highly efficient emergency electrical power system in which the generator is mounted away from the control point and all of the necessary control operations necessary for long term operation are performed from such control point.

While the invention has been described and illustrated in detail, it is to be clearly understood that it is intended by way of illustration and example only and is not to be taken by way of limitation, the spirit and scope of this invention being limited only by the terms of the following claims.

I claim:
1. In an electrical power system for providing power to a civil defense shelter,
   a bombproof compartment, said compartment having a cover thereon providing access to the atmosphere,
   an engine-generator installed in said compartment,
   a fuel supply for said engine-generator, and
   control means located in said shelter for controlling said generator, said control means including means for providing a mechanical actuation in response to the pressure of said fuel supply when said engine is energized, said mechanical actuation being utilized to open said cover and to facilitate the starting of said engine.

2. The system as recited in claim 1 wherein said means for providing a mechanical actuation comprises a rod, a cylinder, a piston slidably mounted in said cylinder, said piston being connected to said rod, said rod being connected to said cover, means for permitting fuel from said fuel supply to enter said cylinder to raise said rod a predetermined amount when said engine is started, and means for permitting the fuel in said cylinder to run out therefrom when said engine is shut down.

3. The system as recited in claim 2 wherein said means for permitting fuel to enter said cylinder includes a valve interposed between said fuel supply and said cylinder, said valve being connected to said rod and substantially closing when said rod is raised said predetermined amount.

4. In an electrical power system for providing power to a civil defense shelter,
   a bombproof compartment, said compartment having a cover thereon providing access to the atmosphere,
   an engine-generator installed in said compartment,
   a pressurized fluid supply, and
   control means located in said shelter for controlling said generator, said control means including means for providing a mechanical actuation for raising the cover of said compartment and aiding the starting of said engine-generator in response to the pressure of said fluid supply when said engine is energized and closing the cover of said compartment when said engine is shut down.

5. The system as recited in claim 4 wherein said control means includes a control panel and switch means interposed between said panel and said generator, said switch means being closed in response to said mechanical actuation when said engine is energized.

6. An emergency electrical power system for supplying power to a civil defense shelter comprising
   a bombproof compartment, said compartment having a cover thereon for providing access to the atmosphere,
   an engine-generator installed in said compartment,
   a fuel supply for said engine-generator,
   a cylinder,
   a piston slidably mounted in said cylinder, said piston being connected to said cover,
   an outlet line,
   valve means for alternatively connecting said fuel supply to said cylinder and said engine-generator or connecting said cylinder to said outlet line, and
   switch means located in said shelter for controlling said valve means.

7. The power system as recited in claim 6 and additionally including a start pull-rope connected to said generator, said pull-rope being connected to said piston.

References Cited by the Examiner
UNITED STATES PATENTS

| | | | |
|---|---|---|---|
| 1,151,540 | 8/1915 | Hoar. | |
| 1,976,236 | 10/1934 | Lazich | 290—30 |
| 2,104,259 | 1/1938 | Kales | 290—1 |
| 2,213,682 | 9/1940 | Antonsen | 290—1 |
| 2,316,513 | 4/1943 | Gay | 322—14 |
| 2,359,886 | 10/1944 | Witkenhausen | 322—14 |
| 2,498,793 | 2/1950 | Critchfield | 320—61 |
| 3,151,285 | 9/1964 | Rainey | 320—61 |
| 3,181,554 | 5/1965 | Cook et al. | 109—1 X |
| 3,185,873 | 5/1965 | Rosenfeld | 290—1 X |

ORIS L. RADER, *Primary Examiner.*

G. SIMMONS, *Assistant Examiner.*